United States Patent [19]

Rajcic et al.

[11] 4,155,388
[45] May 22, 1979

[54] TRACTION DEVICE ASSEMBLY FOR MOUNTING ON A VEHICLE TIRE

[76] Inventors: Slavko B. Rajcic, 404 Dewalt Dr., Pittsburgh, Pa. 15234; Ivo Rajcic, 11 Cowan St., Toronto, Ontario, Canada

[21] Appl. No.: 821,807

[22] Filed: Aug. 4, 1977

Related U.S. Application Data

[63] Continuation-in-part of Ser. No. 725,534, Sep. 22, 1976, abandoned.

[51] Int. Cl.² ............................................. B60C 27/06
[52] U.S. Cl. ................................. 152/221; 152/225 C; 152/233
[58] Field of Search ................................. 152/221–238

[56] References Cited

U.S. PATENT DOCUMENTS

| | | | |
|---|---|---|---|
| 1,102,017 | 6/1914 | Dobbins | 152/373 |
| 1,120,052 | 12/1914 | Gray | 152/225 |
| 1,515,491 | 11/1924 | Jordan | 152/229 |
| 2,422,595 | 6/1947 | Stevens | 152/221 |
| 2,467,017 | 4/1949 | Eger | 152/221 X |
| 2,714,914 | 8/1955 | Champigny | 152/222 |
| 2,806,503 | 9/1957 | Hamerski | 152/225 R |
| 2,873,783 | 2/1959 | O'Higgins | 152/225 R X |
| 3,362,450 | 1/1968 | Brown | 152/233 |

*Primary Examiner*—Francis S. Husar
*Assistant Examiner*—D. W. Underwood
*Attorney, Agent, or Firm*—Stanley J. Price, Jr.; John M. Adams

[57] ABSTRACT

A plurality of traction devices are positioned transversely in spaced relation on a tire tread. Each traction device has a first end portion arranged to be guided into one of a plurality of troughs that are positioned on the periphery of a circular member mounted to the unexposed or inside rim of a vehicle wheel. The troughs are separated by crests to form a wave-like configuration on the periphery of the circular member. The first end portion is guided into a trough without the need to visually locate the point of attachment on the circular member. A portion of the first end portion is too large to pass through the trough and serves to secure the traction device to the inside circular member. A second end portion of the traction device is secured on the opposite side of the tire by connection to a second circular member or to the ends of the other traction devices to tightly position an antiskid body portion of the traction device on the tire tread. Each of the traction devices is independently secured so that when one traction device breaks it may be easily replaced without rendering the entire assembly inoperative.

17 Claims, 10 Drawing Figures

TRACTION DEVICE ASSEMBLY FOR MOUNTING ON A VEHICLE TIRE

CROSS REFERENCE TO RELATED APPLICATION

This application is a continuation-in-part of application Ser. No. 725,534 filed on Sept. 22, 1976, now abandoned entitled "Traction Device And Assembly For Mounting On A Vehicle Tire".

BACKGROUND OF THE INVENTION

1. Field of the Invention

This invention relates to a traction device assembly for mounting on a vehicle tire and more particularly to a plurality of traction elements that are transversely positioned in spaced relation on the tire tread with end portions secured for efficient engagement and disengagement to a mounting assembly supported by the wheel rim.

2. Description of the Prior Art

Numerous devices for increasing the vehicle traction on slippery road surfaces, such as snow, ice, mud and the like as alternatives to conventional snow tires are well known in the art. The most commonly known traction device is the tire chain which includes a plurality of cross chains that are positioned transversely on the tire tread. The cross links are interconnected at their end portions by a pair of chains that extend around the periphery of the sidewalls of the tire. The conventional tire chain is difficult to install and in most cases requires that the tire be elevated by jacking the vehicle. Furthermore, when a single link of the tire chain breaks, the broken ends remain engaged to the assembly so that as the tire continues to rotate as the vehicle moves, the free ends of the chain lash the vehicle body and inflict considerable damage thereto. Also, a single broken chain renders the assembly inoperative requiring replacement of the entire tire chain assembly.

U.S. Pat. Nos. 3,856,069 and 3,945,162 disclose modifications to the conventional tire chain in which the cross links are supported on the vehicle tire by strap assemblies positioned inboard and outboard of the tire with the frame and to a backing plate mounted between the wheel and the brake drum with the latter. These modifications to the conventional tire chain are designed to permit the cross links to be tightly held against the tire tread so as to maintain a fixed position on the tread and thereby reduce strain applied to the cross links that contributes to breaking of the chain. A commercially known embodiment of this type of snow tire is manufactured and sold by Detwiler Corp. of Westbury, New York and marketed under the name "SNO-TREADS" in which snow straps are substituted for the cross chains and are secured to the tire at a plurality of points therearound by belts that extend around the tire on the sidewalls. However, as with the devices illustrated in the above mentioned patents, traction devices of this type must be draped over the tire tread with the end portions hooked and the tire assembly tightened and retightened to adjust them after initial use. The cross chains or straps are interconnected so when one chain or strap is broken the entire assembly becomes inoperative.

To overcome the disadvantage of traction elements being interconnected it is known to independently connect each chain or traction device to the tire as illustrated in U.S. Pat. Nos. 1,102,017; 1,599,001; 2,575,263; 2,598,594; 2,729,262; 3,362,450; 3,473,593 and 3,513,897. A principal feature of these patents is supporting the cross chains independently on the tire tread by securing the end portions of the chain to the wheel rim or to circular members that are mounted within the rim and rigidly secured to the wheel. Because each of the cross chains are independently supported on the tire each must be separately installed and the number of cross chains or traction elements that are mounted on the tire is determined by the driving conditions. The primary difficulty encountered is securing the innermost end of the cross chain to the unexposed inside or inboard rim of the wheel or the circular member mounted on the wheel adjacent to the brake drum. The installer is required to reach under the vehicle fender, over the tire and behind the tire and then locate the end portion of the cross chain with the particular point of attachment. This arrangement is considerably inefficient, and the task of locating the end portion within one of a plurality of holes of reduced dimension on the periphery of the mounting assembly, is quite burdensome. Furthermore, if both ends of the cross chains are tightly secured to the mounting assembly on the wheel so as to prevent relative movement of the traction device on the tire tread and the traction device breaks, the severed portions remain secured to the mounting assembly resulting in considerable damage by lashing at the vehicle body.

There is need for traction devices for vehicle tires in which the traction devices are adapted for quick and easy mounting and dismounting and are readily replaceable without dismounting the entire traction assembly on the tire so that a damaged traction device may be easily replaced without rendering the entire assembly inoperative.

SUMMARY OF THE INVENTION

In accordance with the present invention there is provided a traction device assembly for mounting on a vehicle tire that includes a first mounting member adapted to be positioned axially with respect to the tire and to extend axially outwardly from the side of the tire that when mounted on the vehicle is unexposed or positioned inboard. The first mounting member has an outer edge portion that includes a plurality of troughs with each trough being separated by a crest. Each crest extends outwardly from between adjacent troughs so that the total arrangement of troughs and crests forms a wave-like configuration on the outer edge portion of the first mounting member. A plurality of traction devices are provided, each having a first end portion and a second end portion. A body portion connects the first and second end portions. The traction devices are adapted to be positioned so that each of the body portions are arranged transversely in spaced relation on the tread of the tire. A first engaging device is provided on the first end portion of each of the traction devices for releasably engaging the first end portion within one of the troughs of the first mounting member. The first engaging device has an enlarged portion restrained from passing through the trough to thereby secure the first end portion to the first mounting member. A connecting mechanism releasably secures the second end portions of each of the traction devices on the opposite side of the tire to thereby securely position the body portion of each of the traction devices on the tread of the tire.

The body portion of the traction devices may comprise an antiskid chain, strap, or the like having a gripping surface that is to be held in place on the tread of the tire by tightly securing the first and second end portions along the sidewalls of the tire. The first end portion of each traction device is releasably connected to the first mounting member, which is preferably circular in shape and mounted in a suitable manner on the inner cylindrical surface of the wheel rim that supports the tire. The arrangement for connecting the second end portion of each of the traction devices on the opposite side or exposed side of the tire, when mounted on the wheel of a vehicle, may include securing the second end portions to each other. With this arrangement the second end portion is provided with a hole extending through the end portion. The end portions are positioned in overlying relation so that the holes are aligned. A fastening member is extended through the aligned holes to thereby secure the second end portions of the traction devices to each other.

The second end portions of the traction devices may also be secured by connecting them to a second mounting member such as a disc or ring which is detached from the wheel rim but held in place opposite the wheel rim by securing the second end portions oppositely of one another to the periphery of the disc or ring. With this arrangement, the traction devices are connected to the disc or ring member and exert opposing forces thereon so that the disc or ring is positioned axially with respect to the wheel rim. With the first end portions secured the traction devices are tensioned so that the body portions thereof are held tightly in place on the tread of the tire.

A further embodiment of the present invention includes a second mounting member such as a circular member positioned axially with respect to the tire and mounted on the wheel rim. The second circular member extends outwardly from the outboard or exposed side of the tire when mounted on a vehicle. The first and second circular members may each be provided with protrusions on the outer cylindrical surface of the members where the protrusions serve to limit the penetration of the respective circular member into the wheel rim and thereby facilitate their removal from the wheel rim. The first and second circular mounting members may be of any desired configuration, such as polygonal or conical in order to reduce the points of contact with the wheel rim.

In operation when the first mounting member is secured to the wheel rim having a tire mounted thereon, the first mounting member is positioned on the unexposed or inboard side of the tire when the rim is mounted on the vehicle. The outer edge portion of the first mounting member projects inwardly toward the body of the vehicle. The crests on the outer edge portion are formed by a pair of edge portions that expand outwardly from the pointed tip of a crest toward the trough where the crest has a maximum lateral dimension. The troughs are formed by adjacent crests and have an opening of a minimum lateral dimension adjacent the point where the crests have their maximum lateral dimension. With the wave-like configuration, there is no need to visually locate the first end portion of a traction device within a trough to secure it to the mounting member. By bringing the first end portion of a traction device into contact with the outer edge of the first mounting member and by applying a downward force thereto, the lateral edge portions of the crest guide the end portion of the traction device into a trough.

Preferably, the first end portion has an elongated portion that is slidable within a trough and is connected to the enlarged portion. While the elongated portion is operable to pass through a trough, the enlarged portion contacts the body of the mounting member and is restrained from passing through the trough. Thus the first end portion of the traction device is secured to the first mounting member. The second end portion of each traction device is then drawn across the tire tread so that the antiskid body portion is positioned transversely on the tread. The second end portion may then be secured to a second circular mounting member supported by the wheel rim on the exposed side thereof. An alternative arrangement for securing the second end portions of the traction devices is by fastening the end portions to each other or to a disc or ring held in place opposite and detached from the wheel rim by the opposing arrangement of traction devices connected to the disc or ring.

Accordingly, the principal object of the present invention is to provide a traction device assembly for mounting on a vehicle tire supported by a wheel rim in which the assembly is quickly and efficiently mounted and dismounted on the tire, and includes traction elements independently and releasably engaged to a mounting assembly.

Another object of the present invention is to provide a plurality of traction devices that are expediently mounted on a vehicle tire without the need to locate the point of attachment of the end of each traction device at the inboard or unexposed side of the tire.

A further object of the present invention is to independently support a plurality of traction devices transversely on the tread of a tire where the traction devices are easily mounted and dismounted and a broken traction device is released from the tire leaving the remaining traction devices operative on the tire.

These and other objects of the present invention will be more completely described and disclosed in the following specification, the accompanying drawings and the appended claims.

BRIEF DESCRIPTION OF THE DRAWINGS

FIG. 11 is a view in side elevation of the exposed side of a tire when mounted on a vehicle, illustrating the end portions of the traction devices secured to each other by a pin member passing through aligned holes of the end portions.

FIG. 12 is a view similar to FIG. 11, illustrating a disc member detached from the wheel rim for securing the end portions of the traction devices on the exposed side of the wheel.

FIG. 13 is a fragmentary view in side elevation of the outer edge of the circular member shown in FIG. 3 and positioned on the unexposed wheel rim, illustrating a plurality of circular shaped troughs which receive the ends of the traction devices and are separated by crests.

FIG. 14 is a view similar to FIG. 13, illustrating a plurality of elliptical troughs adapted to receive the traction devices having end portions with a cross section of a corresponding elliptical configuration.

FIG. 15 is a fragmentary view in side elevation of the end of a traction device to be inserted in a trough of the circular member on the unexposed side of the tire, illustrating the end portion bent to facilitate positioning within a trough.

FIG. 16 is an end view of the traction device illustrated in FIG. 15.

DESCRIPTION OF THE PREFERRED EMBODIMENTS

Figure 1:
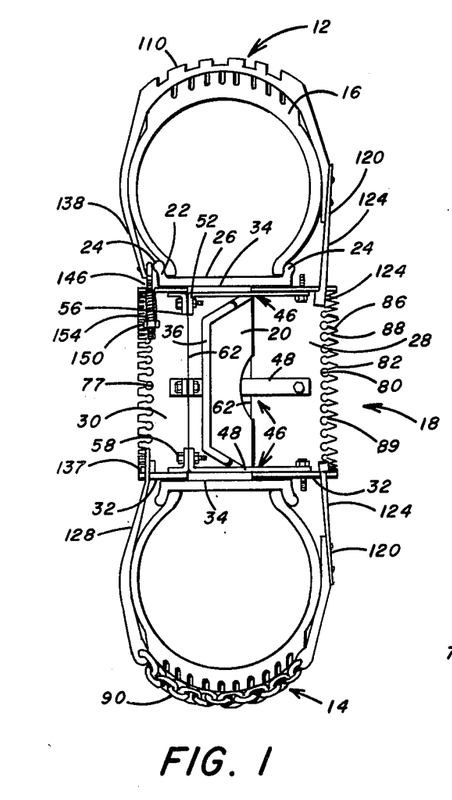
FIG. 1 is a sectional view in elevation of a vehicle tire mounted on a wheel rim, illustrating two embodiments of a traction device that is tightly secured to the tread of the tire by a mounting assembly supported by the wheel rim.

Referring to the drawings and particularly to FIG. 1, there is illustrated a pair of traction devices generally designated by the numerals 12 and 14 that are rigidly secured to the tread of a vehicle tire 16 by a mounting assembly generally designated by the numeral 18. The mounting assembly 18 is secured to and extends outwardly from a wheel 20 that supports the tire 16. The wheel 20 is conventional in design and includes a rim 22 having tire retaining flanges 24 that engage the sidewall of the tire 16 and effect a seal between the tire 16 and outer surface 26 of the wheel rim 22. For the purpose of illustration in FIG. 1 two embodiments of the traction devices of the present invention are illustrated by a strap device 12 and a chain device 14; however, in the the invention a plurality of one type of traction devices are utilized and tightly held in spaced relation on the surface of the tire tread extending from sidewall to sidewall of the tire for increasing traction of the tire on slippery surfaces.

The mounting assembly 18 for supporting the traction devices on the tire tread is axially secured to the rim 22 and extends outwardly therefrom. As illustrated in FIG. 1, the mounting assembly includes two components, a first circular mounting member 28 that extends inboard toward the brake drum when the tire is mounted on the vehicle and a second circular mounting member 30 that extends outwardly from the tire when mounted on the vehicle. In this respect the first mounting member 28 may be referred to as the unexposed mounting member in view of the fact that when the tire is mounted on the vehicle, the circular member 28 is unexposed or hidden from sight. On the other hand, the second mounting member 30 may be referred to as the exposed mounting member in view of the fact that it is visible when the tire is mounted on the vehicle. The mounting members 28 and 30 are adapted for mounting and dismounting on the wheel 20 to facilitate primarily the utilization of the traction devices during the winter months for driving on snow and ice covered roads. However, the mounting assembly may be permanently retained on the wheel or the exposed member 30 removed during the summer months for aesthetic reasons and the unexposed member 28 permanently retained. Further within the scope of the present invention the mounting members may be formed integral with the wheel 20, and the exposed circular member 30 adapted for receiving an ornamental wheel cover.

Figure 4:
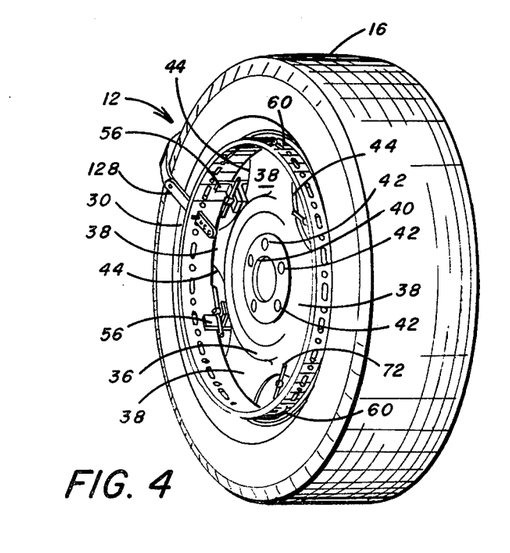
FIG. 4 is an isometric view of the mounting assembly circular member positioned on the exposed wheel rim, illustrating an arrangement for releasably connecting one end of a traction device to the circular member.
Figure 5:
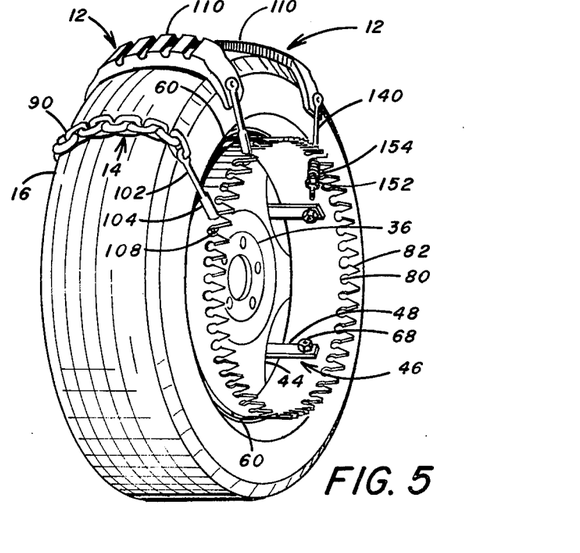
FIG. 5 is a view similar to FIG. 4, illustrating the mounting assembly circular member positioned on the unexposed wheel rim with several embodiments of the traction device releasably secured to the circular member and tightly held against the tire tread.

As illustrated in FIGS. 1, 4 and 5, the mounting members 29 and 30 are secured to the wheel rim 22. To this end the outer diameter of each of the mounting members is approximately equal to the inner diameter of the rim 22 such that outer cylindrical surface 32 of each of the mounting members is arranged for frictional engagement with inner cylindrical surface 34 of rim 22. Typically, the wheel 20 includes an outwardly bulging hub portion 36. A plurality of rib portions 38 illustrated in FIG. 4, extend outwardly from the hub portion 36 to the rim 22. The hub 36 includes a central bore 40 through which the spindle of the axle is extended, and positioned radially of the bore 40 are a plurality of holes 42 for receiving the studs that extend outwardly from the brake drum. Positioned between adjacent rib portions 38 are openings or slots 44 through which are extended connectors generally designated by the numeral 46 for securing together the mounting members 28 and 30 on the wheel 20.

Figure 6:
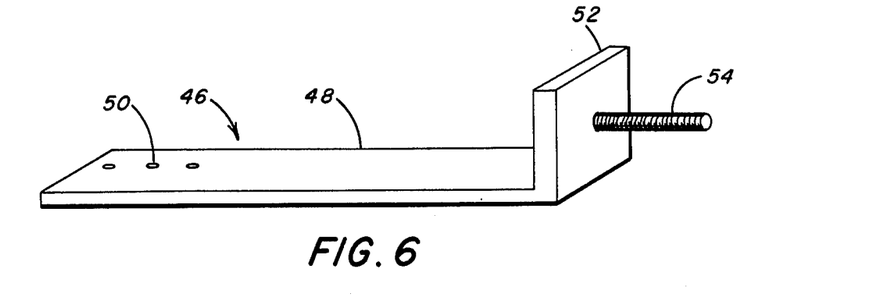
FIG. 6 is an enlarged isometric view of the connector shown in FIG. 3 for mounting the circular members on the wheel rim.

Each of the connectors 46, as illustrated in FIGS. 1 and 6, includes an arm member 48 having one or more threaded bores 50 extending through one end portion and a flanged portion 52 extending upwardly from the other end of the arm member 48. As illustrated in FIG. 6, a threaded stud 54 may extend outwardly from the flanged portion 52. The flanged portion 52 is arranged to abut the free end portion of a flange 56 having its opposite end portion suitable secured, such as by welding, to the inner cylindrical surface of the exposed mounting member 30. The flange 56 and the arm flanged end portion 52 are tightly held together by a nut and bolt combination 58 on the exposed side of the rim 22.

Figure 2:
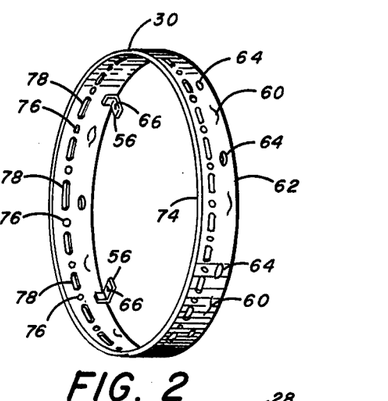
FIG. 2 is an isometric view of a circular member of the mounting assembly that is secured to the exposed surface of the wheel rim, illustrating a plurality of spaced slots and holes for receiving an end portion of each traction device.
Figure 3:
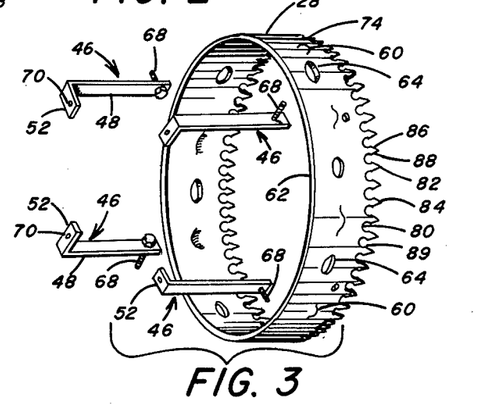
FIG. 3 is an exploded view of a circular member of the mounting assembly that is secured to the unexposed surface of the wheel rim and a connector that is secured to the circular member and extends through the rim for connection to the other circular member, illustrating an outer edge of the circular member having a configuration adapted for expedient engagement and disengagement of the opposite end of each traction device.

The unexposed and exposed mounting members 28 and 30 of the mounting assembly 18, illustrated in FIGS. 2 and 3, are adapted for efficient mounting and dismounting on the wheel 20. Preferably each of the mounting members are secured to the wheel 20 by frictionally engaging the rim 22. However, if it is desired that the mounting member 30 be retained on the wheel 20 without frictionally engaging the rim, the mounting member 30 may be secured to the wheel 20 by connection to mounting member 28 by the connectors 46 as above described.

To facilitate the efficient mounting and dismounting of the members 28 and 30 on the wheel rim, the members may be shaped in any desired configuration, such as polygonal, in order to reduce the points of contact of the members with the wheel rim or conical with the smaller diameter end portion engaging the rim. Further, the circular members 30 may be adapted to be secured to the wheel 20 by a central plate (not shown) connected to the member 30 by spoke-like arms with the center plate overlying hub 36 and having holes for receiving the studs that extend through the holes 42. With this arrangement the mounting member 30 may be engaged and disengaged to the wheel 20.

To facilitate removal of the mounting members 28 and 30 from the wheel rim, protrusions 60 may be provided on the outer cylindrical surface 32 of each member 28 and 30. The protrusions 60 engage the inner surface 34 of the rim 22 and serve to limit the depth the members extend within the rim. By positioning the protrusions 60 a selected distance from the lower edge 62 of each member 28 and 30, the portion of each member which frictionally engages the rim 22 is controlled. This reduces any difficulty that may be encountered in removing the mounting members caused by the collection of dust particles between the surfaces 32 and 34 of the members and the rim respectively.

Elongated slots 64 may also be provided at a selected distance from the edge portions 62 of each member to facilitate removal thereof. With this arrangement when it is desired to remove the mounting members 28 and 30 from the wheel, the slots 64 are engaged by a suitable leverage device by which a force is applied to the circular members to remove them from frictional engagement with the wheel rim 22. However, with the provision of the connectors 46, as stated above, the mounting member 28 is frictionally engaged to the inner surface 34 of the rim 22 and the mounting member 30 is releasably secured by connector 46 to mounting member 28.

As illustrated in FIG. 2, the outwardly projecting leg of each flange 56 on the exposed mounting member 30 includes a bore 66. The bore 66 is aligned with bore 70 of flanged portion 52 on each connector arm member 48, illustrated in FIG. 3. Each arm member 48 extends through a wheel slot 44, as illustrated in FIGS. 4 and 5, and a bolt 68 passing through one of the bores 50 on the opposite end of arm member 48 is threadedly secured to the unexposed mounting member 28. At the opposite end of each arm member 48 on the exposed mounting member 30, the flange 56 is connected to flanged portion 52 by a suitable means, such as nut and bolt combination 58, illustrated in FIG. 1. Alternatively as illustrated in FIG. 6, the threaded stud 54 formed integral with flanged portion 52 is secured to flange 56 by a wing nut 72, as shown in FIG. 4. In this manner the connector arm members 48 are quickly engaged and disengaged to the exposed mounting member 30. Thus, the exposed mounting member 30 may be easily removed from the wheel for extended periods when the traction devices are not employed as during the summer months. Consequently, when the driving conditions demand a need for additional traction as during the winter months, the exposed mounting member 30 is easily positioned on the wheel rim 22 and secured to the unexposed mounting member 28 by the connectors 46.

As illustrated in FIG. 2, the exposed mounting member 30 has an inner edge 62 and an outer edge 74. Spaced a preselected distance from the outer edge 74 are a plurality of spaced holes 76 and slots 78 by which one end portion of the traction device is releasably secured to and retained on the exposed mounting member 30. The holes and slots are equally spaced along the entire circumference of the member 30 and preferably spaced a preselected distance from the outer edge 74 so as to be contained within the body portion of the circular member 30. However, another embodiment of the retention devices for the exposed mounting member 30 is illustrated in FIG. 1 in which the holes 76 are replaced by recesses 77 that are open to the outer edge of member 30 such that the outer edge is interrupted by the recesses 77 and not continuous as illustrated in FIG. 2. This arrangement facilitates removal of a broken traction device from the member 30, as will be hereinafter explained in greater detail.

It will be apparent from the present invention that other retention devices, such as holes 76, recesses 77 and slots 78 or hooks, snaps, swivels and other conventional devices may be employed to connect one end of each traction device to the exposed mounting member 30 depending upon the type of traction device utilized. The opposite end of each traction device is arranged to be secured to the outer edge of the unexposed mounting member 28 by the arrangement illustrated in FIGS. 3, 4 and 13. The outer edge 74 of member 28 has a wavelike configuration formed by troughs 80 and crests 82 which permit installation of the opposite end of each traction device on the unexposed mounting member 28 without the need to visually align the end piece of the traction device in a preselected trough.

Each trough 80 on the unexposed mounting member 28 is separated by a crest 82 having a tip 84 with edges 86 and 88 expanding inwardly from the tip to the trough to form an opening 89 into trough 80. With this arrangement the lateral dimension between adjacent edges 86 and 88 progressively increases from minimum at tip 84 to a maximum at the opening 89 to trough 80. The troughs may have a preselected outline, such as a circular outline illustrated in FIG. 13 or an elliptical outline illustrated in FIG. 14, depending upon the cross sectional shape of the end of the traction device.

Each of the traction devices is held tightly in spaced relation on the tread of the tire by the mounting assembly 18 in which one end portion of each traction device is secured by the holes 76, slots 78 or recesses 77 to the exposed mounting member 30 and the opposite end portion of each traction device is secured by the troughs 80 to the unexposed mounting member 28.

However, another arrangement for securing the end portions of the traction devices on the exposed side of the tire is illustrated in FIGS. 11 and 12. There the need for the mounting member 28 is eliminated by securing the traction devices to each other or to a disc 91 which is positioned spaced from wheel 20 by securing under tension oppositely positioned traction devices to the disc 91. The embodiments of FIGS. 11 and 12 will be explained later in greater detail.

Figure 7:
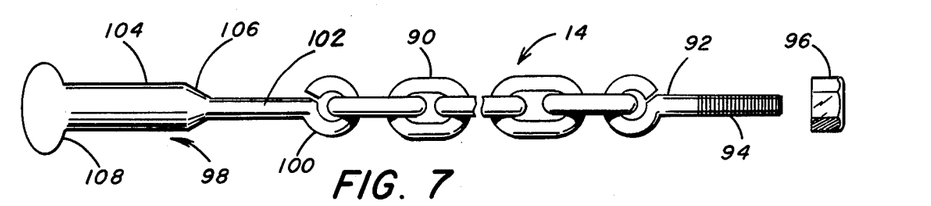
FIG. 7 is an enlarged fragmentary view of one embodiment of the traction device to be supported on the tire tread by the mounting assembly, illustrating a length of chain adopted at one end for expedient connection to the edge of the unexposed circular member and at the other end for releasable threaded connection to the exposed circular member.

One embodiment of a suitable traction device is illustrated in FIG. 7 in which an antiskid link chain 90 includes at one end for connection to exposed mounting member 30, an eyebolt 92 having a threaded end portion 94 for receiving a nut 96 and at the opposite end for connection to the unexposed mounting member 28, an end assembly generally designated by the numeral 98. The end assembly 98 includes an eyebolt 100 having a shaft portion 102 with a cross sectional area which is less than the cross sectional area of each trough opening 89 on the unexposed mounting member 28. The shaft 102 is connected to an elongated member, such as rod 104, by a tapered portion 106 that expands from shaft 102 to rod 104. The rod 104 has a cross sectional area which is greater than the cross sectional area of shaft 102 but less than that of trough 80 to permit slidable movement of rod 104 within a trough 80. Rod 104 terminates in an enlarged end portion 108 having a lateral dimension greater than the lateral dimension of each trough 80. With this arrangement shaft 102 and rod 104 are slidable through a trough 80; whereas, end portion 108 is not slidable through a trough 80 so as to retain the chain 90 on the unexposed mounting member 28.

A plurality of the antiskid chain-type traction devices shown in FIG. 7 are mounted on the tire tread by initially approximately locating a chain 90 at a point on the tread and urging the shaft 102 of assembly 98 into contact with a crest. By applying a downward force upon shaft 102, the lateral edges 86 and 88 of a crest 82 guide the shaft 102 down through the opening 89 and into one of the troughs 80. This operation of securing the end of chain 90 to the unexposed mounting member 28 is accomplished without the need to visually align the shaft 102 with a particular point of attachment to member 28 as contact of the shaft 102 with a crest assures placement of the shaft in a trough. This substantially reduces the difficulty of installing the end of a traction device on the unexposed wheel rim as encountered with other traction devices known heretobefore where the installer was required to bend and reach around the tire mounted on a vehicle to visually locate the point of attachment to the unexposed side of the wheel rim.

With the present invention the shaft 102 is easily positioned within a trough 80 by merely contacting a crest 82 opposite the approximate location on the tire tread where the traction device is to be positioned. When the shaft 102 contacts a trough 80, pulling outwardly on the chain slides the tapered portion 106 and rod 104 through the trough until the enlarged end portion 108 contacts the metal body portion adjacent the trough. With tension on the chain 90 the end portion 108 retains the end of the chain traction device secured to the unexposed mounting member 28. The installation of the chain is completed by drawing the chain under tension across the tire tread and extending eyebolt 92 through a hole 76 on the exposed mounting member 30 of the type illustrated in FIG. 2. A nut 96 is threaded onto end portion 94 extending through hole 76 and into contact with the exposed mounting member 30. Thus the end of the traction device is secured to the exposed mounting member 30.

Any number of traction device maybe mounted on the tire in the above described manner as determined by the driving conditions. Each traction device is independently secured to the wheel so that in the event one traction device breaks the other traction devices remain on the tire and the entire assembly continues in operation. Accordingly, replacement of the broken traction device is quickly and efficiently accomplished without having to replace the entire assembly of traction devices.

Figure 8:
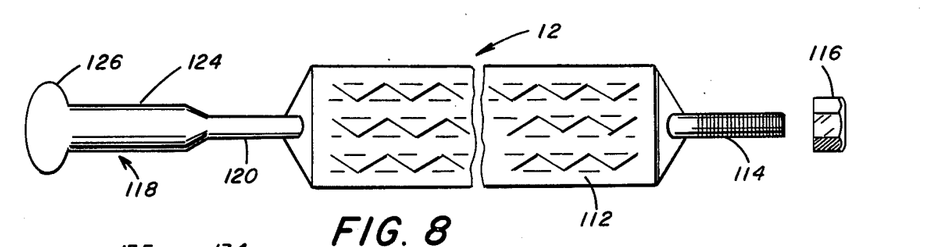
FIG. 8 is a view similar to FIG. 7, illustrating a traction device for connection to the mounting assembly including a strap having a gripping surface for providing added traction on a slippery surface.

In addition to the chain-type traction device 14 other traction devices may be utilized, such as the gripper-type traction device 12 illustrated in FIG. 8. The gripper-type traction device may include a strap 110 fabricated of synthetic material, such as polyurethane having an upper raised and textured surface 112 suitable for gripping a slippery surface such as snow. As illustrated in FIGS. 1 and 3, the gripper-type traction device 12 may include a strip of tire tread cut from a salvaged tire. Secured to one end portion of the strap 110, similar to that of the chain traction device 14, is a threaded rod 114 upon which is advanced a nut 116 when the rod 114 is extended through a hole 76 in the exposed circular member 30 as above described.

On the opposite end portion of the traction strap 110 is an end assembly 118 of the configuration of end assembly 98 as shown in FIG. 7. Similarly, a shaft 120 is secured at one end to the strap 110 and expands from an intermediate portion 122 at the opposite end to an enlarged rod 124 operable to slide through a trough 80 with end portion 126 arranged to retain the rod 124 in the trough. The strap 110 is quickly and easily installed in the same manner as above described for the chain-type traction device 14. With both types of traction devices a preselected tension may be exerted on the traction element so as to tightly hold the element on the surface of the tread. However, should any slack be present, rotation of the tire will slide the traction element on the tread until the slack is taken up and it is tightly positioned.

Figure 9:
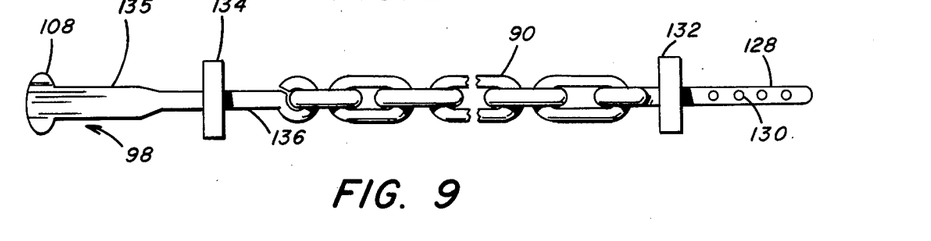
FIG. 9 is a view similar to FIG. 7, illustrating the chain traction device having an alternative means for efficient engagement and disengagement with the mounting assembly on the wheel rim.

Another embodiment of the chain-type traction device of the present invention is illustrated in FIG. 9. This embodiment is designed to be released from connection to the members 28 and 30 when broken to prevent lashing the vehicle body and inflicting damage thereto. In FIG. 9, the eyebolt 92 is replaced by a strip 128 that may be fabricated of spring steel or a cloth material, such as nylon, having a plurality of holes 130 positioned in spaced relation along the length of strip 128. The strip 128 has flat upper and lower surfaces to form a body portion of a suitable thickness to provide the strip with sufficient strength for connection to the exposed mounting member 30. A stop member 132 is provided on the strip 128 adjacent the end of chain 90. The stop member 132 preferably extends at right angles to the strip 128.

At the opposite end of chain 90 in FIG. 9, the end assembly 98 includes a stop member 134 positioned on a bar 136 that is connected by a tapered portion 133 to an elongated flat bar 135. Bar 135 terminates in an enlarged end portion 108 similar to end portion 108 of FIG. 7. End assembly 98 is secured to the unexposed mounting member 28 as above described and illustrated in FIGS. 1 and 5 where the exposed mounting member 30 has an outer edge of recesses 77. With the enlarged end portion 108 retained in a trough 80 of member 28 and the chain 90 extending transversely across the tire tread, the chain is tensioned and strip end portion 128 is extended through a recess 77 on member 30 opposite the trough 80 that receives end portion 108. Preferably, each strip 128 is retained within each recess 77 by extending through a selected one of the holes 130 a fastener such as a pin 137 illustrated in FIGS. 1 and 4, having an expanded head (not shown) to prevent passage of the pin 137 through a hole 130.

The tension applied to the chain is controlled by the length of strip 128 that extends through a recess 77. The positioning and tensioning of strip 128 may be facilitated by extending a rod, such as the end of a screw driver, in the hole adjacent the end of the strip 128 and pulling the strip through a recess until the desired tension is exerted upon the chain and the pin 137 is extended through a selected hole 130 positioned beyound a recess 77 within the periphery of member 30. With the antiskid chain 90 securely held against the tire tread, the bars 135 and 136 and the strip 128 extend downwardly from the tire tread adjacent the sidewalls of the tire. With this arrangement the stop members 132 and 134 adjacent the chain 90 engage the tire sidewall (not shown). It should be pointed out that a threaded bar may be substituted for the strip 128 and secured within a recess 77 on exposed mounting member 30 by a conventional wing nut that is tightly threaded onto the end of the bar.

When the vehicle is in motion and the tires are rotating, the forces exerted upon the traction devices 12 or 14 tend to rotate the devices on the tire tread. However, the stop members 132 and 134, being engaged to the sidewalls of the tire, resist rotation of the traction devices. In the event a chain 90 of traction device 14 or strap 110 of traction device 12 should break, the stop members 132 and 134 are urged away from the sidewalls of the tire and the strip 128 or bar, as the case may be, and the bar 135 at the opposite end turn through an angle of 90° and out of recesses 77 and trough 80 respectively. This permits the separated ends of the traction device to be immediately released from connection to unexposed and exposed mounting members 28 and 30. The broken parts fall from the tire. In this manner the severed end portions of a traction device are not retained on the tire to lash the vehicle body.

Figure 10:
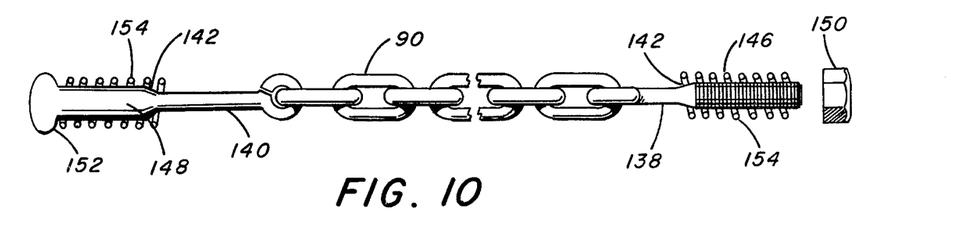
FIG. 10 is a view similar to FIGS. 7 and 9 of the chain traction device to be supported on the tire tread, illustrating connector end portions of the chain having spring members which are compressed by connection of the chain to the mounting assembly and operable to expand when the chain breaks to release the broken chain from the mounting assembly.

In certain applications it may be desired that the traction devices 12 or 14 be retained on the mounting assembly 18 when they break until the vehicle has slowed to a preselected speed, such as 10 miles per hour or less. An embodiment illustrative of a traction device of this type is shown in FIG. 10 in which a severed traction device disengages the circular members 28 and 30 once the vehicle has slowed to a preselected speed. This chain-type traction device, as illustrated in FIG. 10, includes rods 138 and 140 secured to the ends of the chain. Rod 140 is adapted to be received within a trough 80 of member 28 and rod 138, in a recess 77 of member 30. Each rod 138 and 140 expands from a tapered portion 142 to an enlarged rod portion 146 and 148 respectively. The rod portion 146 is threaded to receive a nut 150, and a resilient member, such as a compression spring 154. The rod portion 148 terminates in an enlarged end portion 152 which serves to retain a spring 154 on rod portion 148.

To position the antiskid chain 90 of FIG. 10 on the tire tread, the rod 140 is moved into contact with a crest 82 at a selected point on the periphery of the unexposed mounting member 28. A downward force is applied to rod 140 so as to urge the rod between adjacent lateral edges 84 and 86 of a crest 82 into a trough 80. This is accomplished because the rod 140 is slidable within a trough 80. As stated hereinabove the attachment of the rod 140 to the unexposed mounting member 28 is accomplished without the need to visually align the rod with a trough. The contact of the rod 140 with a crest at an approximate location on mounting member 28 assures that the end of the chain 90 will engage a trough on member 28. With the rod 140 positioned in a trough 80, the spring 154, as illustrated in FIG. 5, is compressed on rod portion 148 between the enlarged end portion 152 and the inner cylindrical surface of the unexposed mounting member 28. The chain 90 is extended across the tire tread under tension and the rod 138 on the other end of the chain is urged into a selected recess 77 on the outer edge 74 of the exposed mounting member 30 so that the tapered portion 142 abuts the inner cylindrical surface of member 30. The nut 150 is then threadedly advanced onto the end of threaded rod 146 to compress the spring 154 between the nut 150 and the inner cylindrical surface of member 30. The rod portion 146 is slidable within a recess 77 as rod portion 148 is slidable within a trough 80. This arrangement is illustrated in FIG. 1 for a traction device having a body portion formed from a tire tread.

In the event the body portion of the traction device of FIG. 10 breaks, the centrifugal force of the wheel rotating at relatively high speed serves to maintain compression of the spring members 154 against the respective circular members 28 and 30 to retain the rod portions 148 and 146 respectively on the edges of each mounting member. As the speed of the vehicle decreases, the centrifugal force applied to the springs decreases so as to release the force thereon allowing the springs to expand outwardly away from the circular members. Eventually at a preselected minimum speed the springs will be fully expanded releasing the rods 138 and 140 from a recess 77 and trough 80 so that the severed end portions of the traction device fall from the tire. The speed at which a broken traction device is released from the mounting assembly 18 may be preselected.

As stated hereinabove the ends of the traction devices adjacent the outboard or exposed side of the tire may be secured to each other, as illustrated in FIG. 11, or to a disc-like member 156, as illustrated in FIG. 12, rather than to a mounting member, such as member 30, to permit deletion of the mounting member from the entire traction device assembly. Each of the traction devices 158 has a first end portion (not shown) which is secured in the above described manner to the unexposed or inboard mounting member 28. A body portion 160 is positioned on the tire tread and a second end portion 162 is extended inwardly from the tire tread along the tire sidewall to a position opposite approximately the center of the wheel 20. The traction devices 158 are each provided with one or more holes for adjustment purposes in the second end portion 162.

The traction devices 158 are mounted in pairs on the tire so that one device is positioned opposite another. The number of pairs to be utilized is dependent upon the degree of traction to be provided, based on the prevailing road conditions. Opposed ends 162 are positioned in overlapping relation so that the holes of the end portions are aligned to receive a suitable fastening member 164, such as a pin, a wing nut assembly, a nut and bolt assembly, or the like. In this manner the second end portions 162 of traction devices 158 are releasably secured on the outboard side of the tire.

In FIG. 12 the traction device end portions 162 are shown secured to a disc-like member 156. A ring member or the like can also be used. The disc member 156 includes a plurality of holes positioned around the periphery of the member. The end portions 162 of oppositely positioned pairs of traction devices 158 are extended into overlapping relation with the disc 156 so that the holes of the end portions are aligned with corresponding holes of the disc. The end portions are secured to the disc by a suitable fastening member 164 extending through the aligned holes. The disc is then supported independently of the wheel 20, and one or more pairs of traction devices 158 exert opposing forces on the disc to hold it in place opposite the wheel 20 so that the antiskid body portion 160 of each traction device 158 is held tightly on the tire tread.

Further, in accordance with the present invention, a traction device 166 is provided and includes a first end portion 168 having the configuration, as illustrated in FIGS. 15 and 16, adapted to be inserted within a trough 80 to releasably secure the traction device 168 to the unexposed mounting member 28. The traction device 166 is preferably composed entirely of a flexible material, such as polyurethane, and further includes a second end portion 170 and an antiskid body portion 172 extending between end portions 168 and 170.

The body portion 172 has a lower surface 174 adapted to be positioned on the tire tread and an upper antiskid surface 176 adapted to contact the road surface and increase the tractive forces between the road surface and tire. As illustrated in FIG. 15 the body portion 172 has an increased thickness and a tread-like pattern on the upper surface 176. The end portion 170 has a plurality of holes 178 therethrough to facilitate attachment of the end portion to the exposed mounting member 30 in the manner above described and illustrated in FIGS. 1 and 4.

The end portion 168 of traction device 166 has a hook-like shape to assist in placing the end portion within a trough 80 of the mounting member 28. In operation the end portion 168 is the first portion of the traction device secured to the mounting assembly 18. This is accomplished by grasping the body portion 172 and extending the end portion 168 over the tread of the tire and into the perimeter of the mounting member 28. The end portion 168 includes an arcuate portion 180 which tapers in width and is connected to an elongated portion 182 having a width of a dimension that permits the portion 182 to pass through a trough 80. An enlarged portion 184 is connected to elongated portion 182. The width of portion 184 is greater than the lateral dimension of a trough 80 so that the enlarged portion 184 is restrained from passing through a trough.

Referring to FIG. 13, the traction device end portion 168 is engaged to the mounting member 28 by placing the elongated portion 182 in overlying relation with the crests 82 opposite a selected point on the periphery of the tire 16. The end portion 168 is urged downwardly, passing the portion 182 between adjacent crests and through the opening 89 into the respective trough 80. The end portion 168 is pulled outwardly until the enlarged portion 184 abuts the inner cylindrical surface of mounting member 28. Then with the body portion surface 172 abutting the tire tread, the body portion 172 is extended transversely across the tread and while maintaining tension on the traction device 166, the end portion 170 is suitably secured on the outboard side of the tire.

In this manner a plurality of traction devices are easily installed. The particular advantage is the ability to secure the traction device end portion 168 to the mounting member 28 without having to visually align the end portion 168 with a trough 80. This permits the installer to remain positioned opposite the outboard side of the tire and not have to bend to a position to observe the inboard side.

The lateral edges 86 and 88 of the crests 82, as illustrated in FIGS. 13 and 14, guide the portion 182 into the trough 80. This requires only bringing the portion 182 into contact with tip 84 and applying a downward force to the portion 182 so that it deflects from the tip onto a lateral edge 86 or 88 into a trough 80. The lateral edge 86 and 88 form an angle A at the crest tip 84. The magnitude of angle A is selective between about 0° and 180° in order to insure that the end of the traction device is deflected into the trough 80.

The trough 80 of FIG. 14 has an elliptical configuration to receive an elongated portion 182 of elliptical cross section. The elliptical configuration serves to prevent rotation of the end portion 168 in the trough 80 and twisting of the antiskid body portion 172 on the tread when the tire rotates to thus reduce wear of the body portion 172.

According to the provision of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A traction device assembly for mounting on a vehicle tire comprising,
    a first mounting member arranged to be positioned axially with respect to the tire and to extend axially outwardly from one side of the tire,
    said first mounting member having an outer edge portion including a plurality of troughs with each trough being separated by a crest, said crest extending outwardly from between adjacent troughs so that the total arrangement of troughs and crests forms a wave-like configuration on said outer edge portion,
    said adjacent crests forming an opening into each trough where said opening has a lateral dimension less than the lateral dimension of said trough,
    a plurality of traction devices each having a first end portion and a second end portion,
    a body portion extending between said first and second end portions,
    said traction devices adapted to be positioned so that each of said body portions are arranged transversely in spaced relation on the tread of the tire,
    first engaging means provided on said first end portion of each of said traction devices for releasably engaging said first end portion within one of said troughs of said first mounting member,
    said first engaging means includes a shaft, an elongated member, a tapered portion, and an enlarged portion,
    said shaft having a cross sectional area less than the lateral dimension of each of said openings and said troughs to permit insertion of said shaft through said opening into said trough and slidable movement through said trough,
    said tapered portion connecting said shaft to said elongated member,
    said elongated member having a lateral dimension greater than the diameter of said shaft and greater than the lateral dimension of each of said openings, and less than the lateral dimension of each of said troughs, said elongated member thereby being operable to slide longitudinally through said trough and being restrained from movement out of said trough through said opening, said enlarged portion being connected to the end of said elongated member and having a lateral dimension greater than the lateral dimension of said trough to prevent longitudinal movement of said enlarged portion through said trough, and connecting means for releasably securing said second end portions of each of said traction devices on the opposite side of the tire to thereby securely position said body portion of each of said traction devices on the tread of the tire.

2. A traction device assembly for mounting on a vehicle tire as set forth in claim 1 in which said connecting means includes, means for connecting said second end portions of each of said traction devices to each other.

3. A traction device assembly for mounting on a vehicle tire as set forth in claim 2 which includes, said second end portion of each of said traction devices having a hole extending therethrough, and a fastening member arranged to extend through said hole so that when said hole of each of said traction devices are aligned said fastening member passes through said holes to secure said second end portions to each other.

4. A traction device assembly for mounting on a vehicle tire as set forth in claim 1 in which said connecting means includes, a second mounting member adapted to be positioned axially with respect to the tire and to extend axially outwardly from the side of the tire opposite to said first mounting member, and means provided on said second mounting member for receiving said second end portion of each of said traction devices so as to exert tension on said traction devices and secure said body portions thereof to the tread of the tire.

5. A traction device assembly for mounting on a vehicle tire as set forth in claim 1 wherein, said connecting means includes a second mounting member adapted to be positioned axially with respect to the tire and to extend axially outwardly from the side of the tire opposite to said first mounting member, means for connecting said first and second mounting members, said second mounting member having an outer edge portion with a plurality of retention devices positioned adjacent said outer edge portion, and means provided on said second end portion of each of said traction devices for releasably engaging said retention devices to thereby secure said traction devices to said second mounting member.

6. A traction device assembly for mounting on a vehicle tire as set forth in claim 5 in which said means for connecting said first and second mounting members includes, a plurality of connector arm members each having a first end portion connected to said first mounting member and a second end portion connected to said second mounting member.

7. A traction device assembly for mounting on a vehicle tire as set forth in claim 1 which includes, a resilient member surrounding said elongated member and positioned between said tapered portion and said enlarged portion, said first mounting member having an inner surface and an outer surface, said tapered portion being operable to extend through a selected one of said troughs so that said elongated member extends from said first mounting member inner surface, said resilient member arranged to be compressed between said inner surface of said first mounting member and said enlarged portion so that in the event said traction device breaks said resilient member initially remains compressed to maintain the broken portion of said traction device on said first mounting member, and said resilient member being operable after said traction device breaks to expand to release the broken portion of said traction device from said first mounting member.

8. A traction device assembly for mounting on a vehicle tire as set forth in claim 5 wherein, said second means on said second end portion of each of said traction devices includes a threaded portion, said retention devices each including a hole, said threaded portion arranged to extend through said hole, and a nut for threadedly engaging the end of said threaded portion to secure said traction device second end portion to said second mounting member.

9. A traction device assembly for mounting on a vehicle tire as set forth in claim 1 wherein, said connecting means includes a second mounting member adapted to be positioned axially with respect to the tire and to extend axially outwardly from the opposite side of the tire, said second mounting member having an outer edge portion with a plurality of spaced slots positioned adjacent said outer edge portion, said second end portion of each of said traction devices including a flexible strip, a plurality of holes extending through said flexible strip in spaced relation along the length thereof, said flexible strip arranged to pass through a selected one of said slots, and a fastener member arranged to extend through a selected one of said holes of said flexible strip opposite said slot and contact said second mounting member outer edge portion to secure said traction device to said second mounting member.

10. A traction device assembly for mounting on a vehicle tire as set forth in claim 1 wherein, said first means on said first end portion of said traction device includes a stop member, said connection means including a second mounting member adapted to be positioned axially with respect to the tire and to extend axially outwardly from the other side of the tire, means for securing said second end portion of each of said traction devices to said second mounting member, a stop member secured to said second end portion of each of said traction devices, and said stop member of said traction devices first and second end portions arranged to engage the sidewalls of the tire when said traction device body portion is positioned on the tread of the tire and thereby prevent rotation of said first and second end portions relative to said first and second mounting members respectively.

11. A traction device assembly for mounting on a vehicle tire as set forth in claim 1 wherein,
said connecting means includes a second mounting member adapted to be positioned axially with respect to the tire and to extend axially outwardly from the opposite side of the tire,
said second mounting member having an inner surface and an outer edge portion with a plurality of recesses spaced on said outer edge portion,
said second end portion of each of said traction devices including a threaded portion having a length of varying diameter and arranged for slidable movement within one of said recesses on said outer edge portion of said second mounting member,
a resilient member surrounding said threaded portion,
a nut for engaging the end of said threaded portion and being operable to compress said resilient member between said nut and said inner surface of said second mounting member, and
said resilient member being operable to expand and release said traction device second end portion from said second mounting member in the event said traction device breaks.

12. A traction device assembly for mounting on a vehicle tire as set forth in claim 1 in which said traction device body portion includes,
an antiskid chain of a preselected length and being adapted to tightly abut the tread of the tire.

13. A traction device assembly for mounting on a vehicle tire as set forth in claim 1 in which said traction device body portion includes,
a strap of a preselected length and being adapted to tightly abut the tread of the tire, and
said strap having a gripping surface for engaging a road surface to provide increased traction between the tread of the tire and the road surface.

14. A traction device assembly for mounting on a vehicle tire as set forth in claim 13 which includes,
said strap being fabricated of polyurethane.

15. A traction device assembly for mounting on a vehicle tire as set forth in claim 13 which includes,
said strap being fabricated of a section of tire tread.

16. A traction device assembly for mounting on a vehicle tire comprising,
a first mounting member adapted to be positioned axially with respect to the tire and to extend axially outwardly from one side of the tire,
said first mounting member having an outer edge portion including a plurality of troughs with each trough being separated by a crest, said crest extending outwardly from between adjacent troughs to form a wave-like configuration on said outer edge,
said adjacent crests forming an opening into each trough where said opening has a lateral dimension less than the lateral dimension of said trough,
a second mounting member adapted to be positioned axially with respect to the tire and to extend axially outwardly from the opposite side of the tire,
said second mounting member having an outer edge portion with a plurality of retention devices positioned adjacent said outer edge portion,
a plurality of traction devices positioned transversely in spaced relation on the tread of the tire,
said traction devices each having a first end portion and a second end portion,
a said first end portion including a shaft portion having a cross sectional area less than the cross sectional area of each of said troughs to permit slidable movement of said shaft portion therein,
an enlongated portion of said first end portion, said elongated portion having a lateral dimension greater than the diameter of said shaft and greater than the lateral dimension of each of said openings, and less than the lateral dimension of each of said troughs,
said elongated portion thereby being operable to slide longitudinally through said trough and being restrained from movement out of said trough through said opening,
a tapered portion for connecting said shaft portion to one end of said elongated portion,
said tapered portion progressively increasing in cross sectional area from said shaft portion to said elongated portion to permit slidable movement of said shaft portion and said elongated portion within each of said troughs,
an enlarged portion connected to the other end of said elongated portion,
said enlarged portion having a lateral dimension greater than the lateral dimension of each of said troughs to prevent longitudinal movement of said enlarged portion through each of said troughs, and
fastener means secured to said second end portion of each of said traction devices for engaging said retention devices on said second mounting member to tightly position said traction devices on the tread of the tire.

17. A traction device assembly for mounting on a vehicle tire as set forth in claim 16 wherein,
a first resilient means surrounding said elongated portion and being operable to be compressed between said enlarged portion and said outer edge portion of said first mounting member, and
a second resilient means surrounding said fastener means and being operable to be compressed between said fastener means and said outer edge portion of said second mounting member.

* * * * *